United States Patent
Huber et al.

(10) Patent No.: US 6,795,484 B1
(45) Date of Patent: Sep. 21, 2004

(54) METHOD AND SYSTEM FOR REDUCING A FOAM IN A GLASS MELTING FURNACE

(75) Inventors: Aaron Morgan Huber, Castle Rock, CO (US); Brandon Dillan Tinianov, Littleton, CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 10/440,631

(22) Filed: May 19, 2003

(51) Int. Cl.[7] ................................................ C03B 5/02
(52) U.S. Cl. ........................................ 373/27; 373/30
(58) Field of Search ........................ 373/27, 29, 30–32, 373/39–41; 65/135.2, 135.6, 178, 347, DIG. 4; 95/30; 96/175; 516/132

(56) References Cited

U.S. PATENT DOCUMENTS

| | | | |
|---|---|---|---|
| 2,376,221 A | | 5/1945 | Baker |
| 2,635,388 A | * | 4/1953 | Peyches et al. ............ 65/135.2 |
| 3,151,958 A | | 10/1964 | Bodine |
| 3,237,384 A | | 3/1966 | Rich |
| 3,284,991 A | | 11/1966 | Ploeger et al. |
| 3,853,500 A | | 12/1974 | Gassmann et al. |
| 3,904,392 A | | 9/1975 | VanIngen et al. |
| 4,042,410 A | | 8/1977 | Ito |
| 4,070,167 A | | 1/1978 | Barbee et al. |
| 4,127,394 A | * | 11/1978 | Verhille ...................... 516/132 |
| 4,316,734 A | * | 2/1982 | Spinosa et al. ............ 65/135.2 |
| 4,339,247 A | | 7/1982 | Faulkner et al. |
| 4,398,925 A | | 8/1983 | Trinh et al. |
| 4,428,757 A | | 1/1984 | Hall |
| 4,534,774 A | | 8/1985 | Lecoffre et al. |
| 4,549,896 A | | 10/1985 | Streicher et al. |
| 5,022,899 A | | 6/1991 | Hohlfeld et al. |
| 5,279,647 A | | 1/1994 | Gatten et al. |
| 5,372,634 A | | 12/1994 | Monahan |
| 5,373,212 A | | 12/1994 | Beau |
| 5,459,699 A | | 10/1995 | Walter |
| 5,476,573 A | | 12/1995 | Hirose et al. |
| 5,508,975 A | | 4/1996 | Walter |
| 5,585,044 A | | 12/1996 | Kawakami et al. |
| 5,613,456 A | | 3/1997 | Kuklinski |
| 5,665,137 A | | 9/1997 | Huang |
| 5,834,625 A | | 11/1998 | Kraus, Jr. et al. |
| 5,853,456 A | | 12/1998 | Bryan et al. |
| 5,885,424 A | | 3/1999 | Davis et al. |
| 5,951,456 A | | 9/1999 | Scott |
| 6,106,590 A | | 8/2000 | Ueno et al. |
| 6,123,044 A | | 9/2000 | Kuklinski |
| 6,308,534 B1 | | 10/2001 | Takei et al. |
| 6,332,339 B1 | | 12/2001 | Kawaguchi et al. |
| 6,401,492 B1 | | 6/2002 | Nattermann |
| 6,465,243 B2 | | 10/2002 | Okada et al. |
| 6,536,238 B2 | | 3/2003 | Kawaguchi et al. |
| 6,555,009 B2 | | 4/2003 | Varadaraj |
| 6,560,996 B2 | | 5/2003 | Takei et al. |
| 6,588,233 B2 | | 7/2003 | Nattermann |
| 6,590,000 B2 | | 7/2003 | Varadaraj |
| 6,620,226 B2 | | 9/2003 | Hutton et al. |
| 6,648,943 B2 | | 11/2003 | Possanza et al. |
| 2002/0026811 A1 | | 3/2002 | Hoyer et al. |
| 2003/0015000 A1 | | 1/2003 | Hayes et al. |
| 2003/0051509 A1 | | 3/2003 | Sakai et al. |
| 2003/0066315 A1 | | 4/2003 | Sakai et al. |

OTHER PUBLICATIONS

Sergey V. Komarov et al., "Control of Foam Height by Using Sound Waves", ISIJ International vol. 39, No. 12 (1999), pp. 1207–1216.

* cited by examiner

Primary Examiner—Tu Ba Hoang
(74) Attorney, Agent, or Firm—Robert D. Touslee

(57) ABSTRACT

Provided is a method for reducing or removing a foam present in a glass melting furnace, including providing an ultrasonic energy emitted from at least one ultrasonic energy source to a foam present above the surface of a molten material in a glass melting furnace. The ultrasonic energy is effective to reduce or remove at least a part of the foam. Also provided is a system for reducing or removing a foam present in a glass melting furnace.

38 Claims, 2 Drawing Sheets

METHOD AND SYSTEM FOR REDUCING A FOAM IN A GLASS MELTING FURNACE

BACKGROUND OF THE INVENTION

1. Field of the Invention

The present invention relates to a method and system for reducing or removing a foam in a glass melting furnace, and in particular to a method and system for reducing or removing a foam formed during a glass melting process.

2. Description of the Related Art

A glass melting furnace is conventionally used to melt an initial raw material to form a molten material which can be subsequently processed into a glass product. For example, the molten material can be used to form glass fibers. Such glass fibers can be used, for example, in insulation and structural reinforcement applications. In addition to glass fibers, the molten material provided by a glass melting furnace can be used to form, for example, flat glass, glass containers and various specialty glass products.

During the melting of the initial raw material introduced into the glass melting furnace, a foam is typically formed above the molten material in the furnace. The foam can be formed from the evolution of gas during the melting of the initial raw material. Generally, the foam contains small bubbles held together by a matrix of molten material, and forms a layer over at least a part of the surface of the molten material. The physical characteristics of such foam layer can depend on the conditions in the furnace. Foam layer thickness, for example, typically can be from about 2 inches (5.1 cm) to about 4 inches (10.2 cm).

The presence of foam can impede the transfer of heat from a heat source of the glass melting furnace, to the initial raw material and/or the molten material present underneath the foam. In conventional systems, the heat source typically must therefore provide an additional amount of heat in order to compensate for the insulating effect of the foam. As a result, the presence of the foam can increase the operating costs of the glass melting furnace. Further, the increased temperature in the furnace can shorten the operating life of the furnace and/or increase the production of particular exhaust gases such as, for example, $NO_x$ gases and toxic metal oxide gases.

In light of the above, reducing the foam in a glass melting furnace can be advantageous at least because such reduction can result in an increase in energy efficiency. For example, it has been estimated that the cumulative impact of removing about half of the foam in U.S. combustion-heated glass furnaces could result in an annual energy savings of as much as 12 to 14 trillion BTU. Further, abating the foam in a furnace can extend furnace life as well as reduce the production of particular exhaust gases.

Reducing or removing the foam present above the molten material in a glass melting furnace can be difficult to achieve. For example, various attempts at foam abatement including adjusting the glass chemistry (e.g., by using chemical additives in the initial raw material) and varying the furnace crown heating profile, have been ineffective and/or unpredictable. In addition, using an oxygen rich combustion heat source in place of an air combustion heat source can actually result in an increase in foam generation.

In view of the foregoing, an object of the present invention is to provide a method and system of reducing or removing a foam present in a glass melting furnace. Other objects and aspects of the present invention will become apparent to one of ordinary skill in the art upon review of the specification, drawings and claims appended hereto.

SUMMARY OF THE INVENTION

According to one aspect of the present invention, a method for reducing or removing a foam present in a glass melting furnace is provided. The method comprises providing an ultrasonic energy emitted from at least one ultrasonic energy source to a foam present above the surface of a molten material in a glass melting furnace, wherein the ultrasonic energy is effective to selectively reduce or remove at least a part of the foam.

According to another aspect of the present invention, a system for reducing or removing a foam present in a glass melting furnace is provided. The system comprises at least one ultrasonic energy source for providing an ultrasonic energy to a foam present above the surface of a molten material in the glass melting furnace, wherein the ultrasonic energy is effective to selectively reduce or remove the foam.

BRIEF DESCRIPTION OF DRAWINGS

Objects and advantages of the invention will become apparent from the following detailed description of the preferred embodiments thereof in connection with the accompanying drawings, in which.

DETAILED DESCRIPTION OF THE PREFERRED EMBODIMENTS OF THE INVENTION

Reducing or removing the foam present in a glass melting furnace in accordance with the present invention can provide several advantages. For example, reducing or removing the foam can lead to the reduction of the energy needed to melt the initial raw material introduced into the glass melting furnace and/or the energy required to maintain the molten material at an optimal temperature. In addition, a reduction in energy usage can in turn extend furnace life and/or reduce the production of particular furnace exhaust gases such as, for example, $NO_x$ gases and toxic metal oxide gases.

Figure 1:
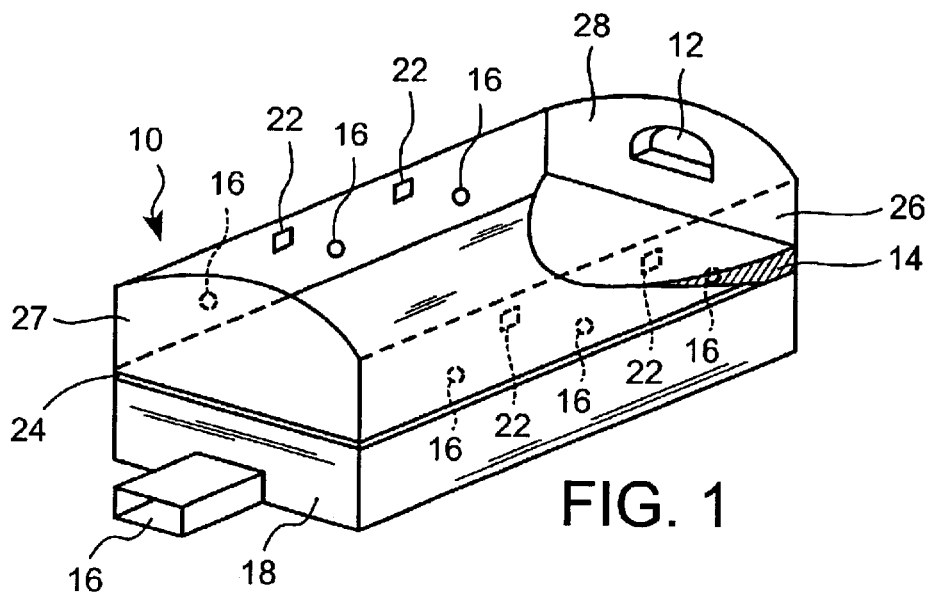
FIG. 1 is a perspective view of a system which includes a glass melting furnace wherein ultrasonic energy sources are arranged at the sidewalls of the furnace, in accordance with one aspect of the present invention.

Referring to FIG. 1, a furnace such as a glass melting furnace 10 is provided for melting an initial raw material introduced thereto, and providing a flow of molten material 18 therefrom. The molten material can include molten glass as the primary component. The furnace 10 can have any shape suitable for melting the initial raw material and providing the molten material 18, preferably an elongated shape. In an exemplary embodiment, the furnace 10 includes two side walls 26, 27 and a crown 28, which is the upper surface of the furnace 10.

The initial raw material can include any material suitable for forming the molten material 18 such as, for example, limestone, glass, sand, soda ash, feldspar and mixtures thereof. In one embodiment, a glass composition for producing glass fibers is "E-glass," which typically includes 52–56% $SiO_2$, 12–16% $Al_2O_3$, 0–0.8% $Fe_2O_3$, 16–25% CaO, 0–6% MgO, 0–10% $B_2O_3$, 0–2% $na2OO+K_2O$, 0–1.5% $TiO_2$ and 0–1% $F_2$. The initial raw material can be provided in any form such as, for example, relatively small particles. Upon entry into the furnace 10, the initial raw material can form a batch blanket 14 at one end of the furnace 10.

The initial raw material can be introduced into the furnace 10 on a batch, semi-continuous or continuous basis. In some embodiments, a port 12 is arranged at an end of the furnace 10 through which the initial raw material is introduced. The port 12 can be positioned above the surface of the molten material 18. The amount of the initial raw material introduced into the furnace 10 can be a function of, for example, the capacity and operating conditions of the furnace 10 as well as the rate at which the molten material 18 is removed from the furnace 10.

The molten material 18 formed from the initial raw material can be removed from the furnace 10 via a throat 16 located at an end of the furnace 10 that is opposite the end at which the port 12 is positioned. Preferably, the throat 16 is arranged below the surface of the molten material 18. The molten material 18 can be removed from the furnace 10 on a batch, semi-continuous basis or continuous basis. In many embodiments, the molten material 18 continuously flows in the furnace 10 from the point at which it is formed to the throat 16 where it is removed. Thereafter, the molten material 18 can be processed by any suitable known technique, for example, a process for forming glass fibers.

The glass melting furnace 10 utilizes at least one heat source 16 which provides heat to the initial raw material and/or molten material 18 in the furnace 10. Preferably, a plurality of heat sources 16 is used. The at least one heat source 16 can be, for example, an air combustion burner, an oxygen combustion burner or a combination of air and oxygen combustion burners. Other types of heat sources known in the art, such as electrical or induction, can be used in conjunction with or in place of the combustion burner.

The at least one heat source 16 can be arranged at any position in the furnace 10 which is suitable for heating the initial raw material and/or molten material 18. In many embodiments, a heat source or plurality of heat sources 16 are arranged at each sidewall 26, 27 of the furnace 10. At least one heat source or plurality of heat sources 16 can also be positioned at the crown 28 of the furnace 10.

The at least one heat source 16 may provide an amount of heat which is effective to melt the initial raw material to form the molten material 18, and to maintain the molten material 18 in its molten state. The optimal temperature for melting the initial raw material and maintaining the molten material 18 in its molten state can depend on, for example, the composition of the initial raw material and the rate at which the molten material 18 is removed from the furnace 10. For example, the maximum temperature in the furnace 10 can be at least about 1400 C., preferably from about 1400 C. to about 1650 C. The temperature of the molten material 18 can be from about 1050 C. to about 1450 C.; however, the present invention is not limited to operation within the above temperature ranges. The molten material 18 removed from the furnace 10 is typically a substantially homogeneous composition, but is not limited thereto.

A foam layer 24 is present above the surface of the molten material 18 in the furnace 10. As used herein, the term "above the surface of the molten material" includes foam that is in the upper most region of, or on the surface of the molten material 18.

At least a part of the foam layer 24 can be formed during the melting of the initial raw material. The foam layer 24 can at least partially include primary foam which refers to foam generated near the batch blanket 14 and which typically includes $CO_2$-rich bubbles. The foam layer 24 can also at least partially include "secondary foam" which refers to foam generated from the evolution of gases formed from the chemistry of the fining process including, for example, sulfur dioxide ($SO_2$), oxygen ($O_2$) and carbon dioxide ($CO_2$).

Also, the foam layer 24 can be at least partially formed from additional sources of foam in the furnace 10. For example, the foam layer 24 can include foam produced from injecting or bubbling a gas into the molten material 18 and/or the agitation of the molten material 18.

The foam layer 24 is present above at least a portion of the surface of the molten material 18, and can also be present above unmelted raw material particles present at the surface of the molten material 18. For example, the foam layer 24 can be present above the majority of the surface of the molten material 18, or substantially above the entire surface of the molten material 18.

While not wishing to be bound to any particular theory, the amount and type of foam generated during the melting process is believed to be a function of, for example, the composition of the initial raw material, the presence of contaminants such as organic contaminants in the initial raw material, the redox state of the molten glass, the furnace temperature and atmosphere, and/or the rate of removal of the molten material 18 from the furnace 10. The foam layer 24 can have any thickness and is not limited to having a uniform thickness. For example, the thickness of the foam layer 24 can be about from about 1 inch (2.5 cm) to 4 inches (10.2 cm), or greater.

According to one aspect of the present invention, at least one acoustic energy source 22 is arranged to provide acoustic energy to at least a portion of the foam layer 24 present in the furnace 10. In some embodiments, the at least one acoustic energy source 22 comprises at least one ultrasonic energy source 22 which provides ultrasonic energy. The ultrasonic energy provided by the at least one ultrasonic energy source 22 is effective to reduce or remove at least a part of the foam layer 24 present in the glass melting furnace 10.

While not wishing to be bound to any particular theory, it is believed that the ultrasonic energy can reduce or remove the foam by destabilizing the matrix of molten material which traps gas in the foam. For example, the ultrasonic energy can cause the reduction or removal of the foam through a plurality of mechanisms, for example, transient and stable cavitation. In transient cavitation, the binding between molecules in the foam is broken when the foam is subjected to a relatively high level of acoustic energy. As a result, microscopic bubbles can be formed which are typically highly unstable and subsequently implode. In stable cavitation, the violent rupturing of the foam structure generates eddies in the surrounding molten material. The generation of eddies in the molten material, also known as microstreaming, can cause further rupturing of the foam structure. Other mechanisms can occur instead of or in addition to the transient and stable cavitation discussed above, and the present invention is not limited to any particular theory of the removal of the foam above the surface of molten material by acoustic energy.

According to the present invention, the at least one ultrasonic energy source 22 can emit ultrasonic energy at a frequency which is effective to reduce or remove at least a part of the portion of the foam layer 24 to which the ultrasonic energy is provided. By use of the at least one ultrasonic energy source 22, the part of the foam layer 24 to which the ultrasonic energy is provided can be reduced by from about 25% to about 100% of the thickness of the foam, preferably from about 50% to about 100% of the thickness of the foam.

The frequency and intensity of the emitted ultrasonic energy can effect the degree of reduction or removal of the foam layer 24. For example, the ultrasonic energy emission can be at a frequency of from about 25 kHz to about 125 kHz, more preferably from about 25 kHz to about 75 kHz, and most preferably from about 25 kHz to about 50 kHz.

The intensity of the ultrasonic energy can be from about 100–160 dB, more preferably from about 100–140 dB, and most preferably from about 100–120 dB. One ultrasonic energy source suitable for use present invention is available from the Power Ultrasonic Group of the Instituto de Acustica, located in Madrid, Spain.

The at least one ultrasonic energy source 22 can be arranged in any position which enables the at least one ultrasonic energy source 22 to provide ultrasonic energy to the foam layer 24. In some embodiments, the at least one ultrasonic energy source 22 is arranged to provide ultrasonic energy to the upper surface of the foam layer 24, such as being arranged above the surface of the molten material 18. For example, the at least one ultrasonic energy source 22 can be arranged at one or both of the sidewalls 26, 27 and/or the crown 28 of the furnace 10.

The ultrasonic energy source 22 preferably introduces ultrasonic energy into the space in the furnace 10 above the surface of the molten material 18. That is, the ultrasonic energy preferably is not directly introduced into the molten material 18 itself.

In one embodiment, the at least one ultrasonic energy source 22 can be arranged to provide ultrasonic energy to an upstream portion of the foam layer 24, for example, the foam that is adjacent to the batch blanket 14. The term "upstream portion of the foam layer" as used herein refers to the half of the foam layer 24 that is closer to the port end of the furnace 10. Because there can be a current of molten material 18 flowing from the port end to the throat end in the furnace 10, treating the upstream portion of the foam layer 24 can be particularly effective to reduce the overall amount of foam present in the furnace 10.

The at least one ultrasonic energy source 22 can be effective to provide ultrasonic energy to any amount of the surface area of the foam layer 24, preferably from about 10% to about 50% of the surface area of the foam layer 24. In other embodiments, the at least one ultrasonic energy source 22 is effective to provide ultrasonic energy to substantially the entire surface area of the foam layer 24.

Figure 2:
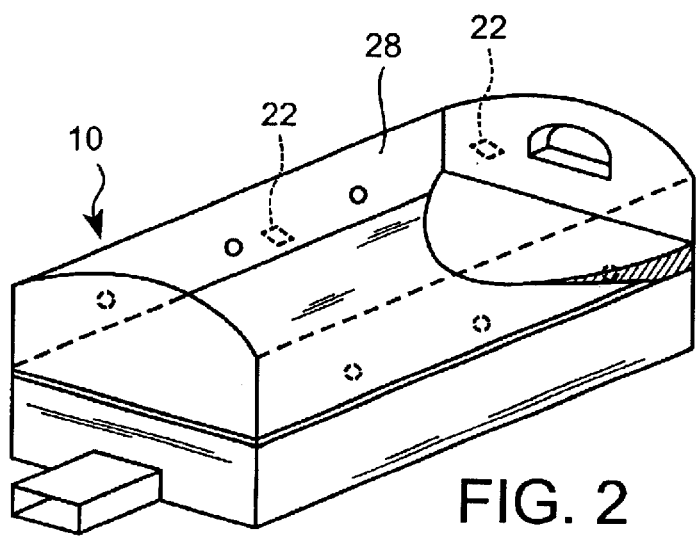
FIG. 2 is a perspective view of a system which includes a glass melting furnace wherein ultrasonic energy sources are arranged at the crown of the furnace, in accordance with another aspect of the present invention.
Figure 3:
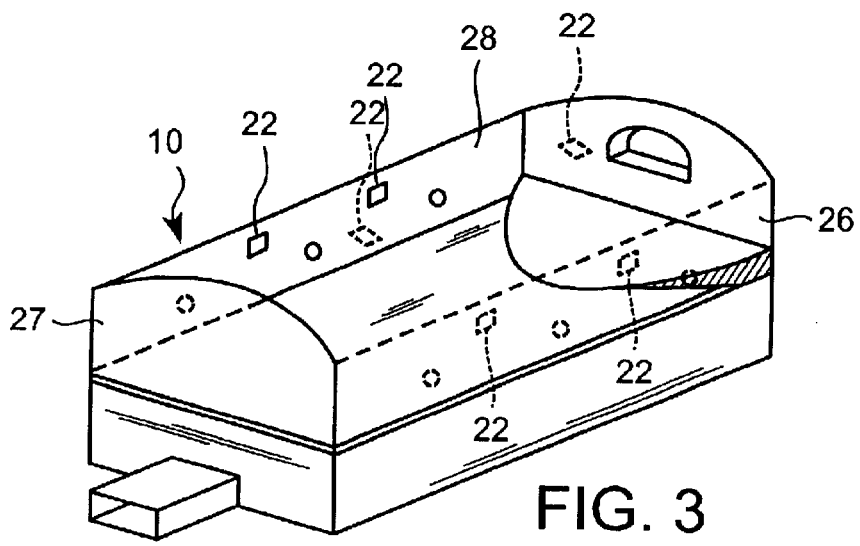
FIG. 3 is a perspective view of a system which includes a glass melting furnace wherein ultrasonic energy sources are arranged at the sidewalls and the crown of the furnace, in accordance with another aspect of the present invention.

Referring to FIGS. 1 to 3 which illustrate exemplary embodiments of the present invention, a plurality of ultrasonic energy sources 22 can be utilized, and various configurations of the ultrasonic energy sources 22 can be used. As shown in FIG. 1, a plurality of ultrasonic energy sources 22 can be positioned at each sidewall 26, 27 of the furnace 10. Referring to FIG. 2, a plurality of ultrasonic energy sources 22 can be arranged at the crown 28 of the furnace 10. In FIG. 3, a plurality of ultrasonic energy sources 22 can be arranged at each sidewall 26, 27 as well as the crown 28 of the furnace 10.

Figure 4A:
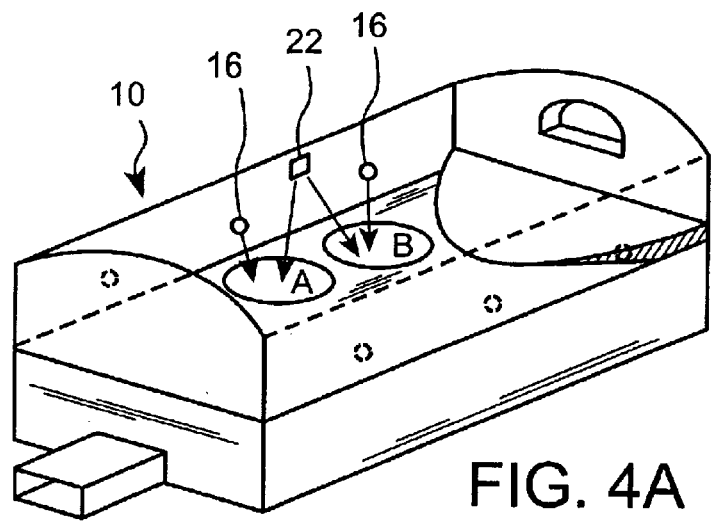
FIG. 4A is a perspective view of a system which includes a glass melting furnace wherein an ultrasonic energy source alternately provides ultrasonic energy to two non-overlapping zones of the foam layer, in accordance with another of the present invention.
Figure 4B:
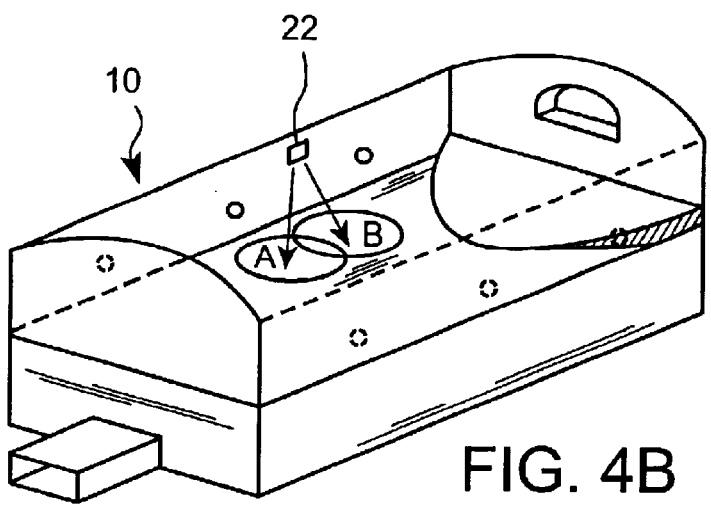
FIG. 4B is a perspective view of a system which includes a glass melting furnace wherein an ultrasonic energy source alternately provides ultrasonic energy to two overlapping zones of the foam layer, in accordance with another aspect of the present invention.

Referring to FIGS. 4A and 4B, and in accordance with additional aspects of the present invention, the at least one ultrasonic energy source 22 can alternately provide ultrasonic energy to a plurality of zones A, B of the foam layer 24. The plurality of zones A, B can each encompass a separate part of the foam layer 24 as shown in FIG. 4A, or can overlap with another zone as shown in FIG. 4B.

This can be implemented by using, for example, an ultrasonic energy source 22 which is moveable and/or rotatable. A motor or other suitable device (not shown) can be used to move and/or rotate the ultrasonic energy source 22, thereby redirecting the ultrasonic energy between the plurality of zones A, B. In the above exemplary embodiments, a single ultrasonic energy source 22 can be used to provide ultrasonic energy to a plurality of zones A, B of the foam layer 24, thereby potentially reducing the total number of ultrasonic energy sources 22 needed to provide ultrasonic energy to a large surface area of the foam layer 24.

The foam layer 24 can contain different types of foams at different zones of the furnace 10. To achieve the reduction or removal of different types of foams present in the furnace 10, a plurality of ultrasonic energy sources 22 can be used wherein each ultrasonic energy source 22 provides a particular type of ultrasonic energy which is suitable for removing or reducing a particular type of foam.

Figure 5:
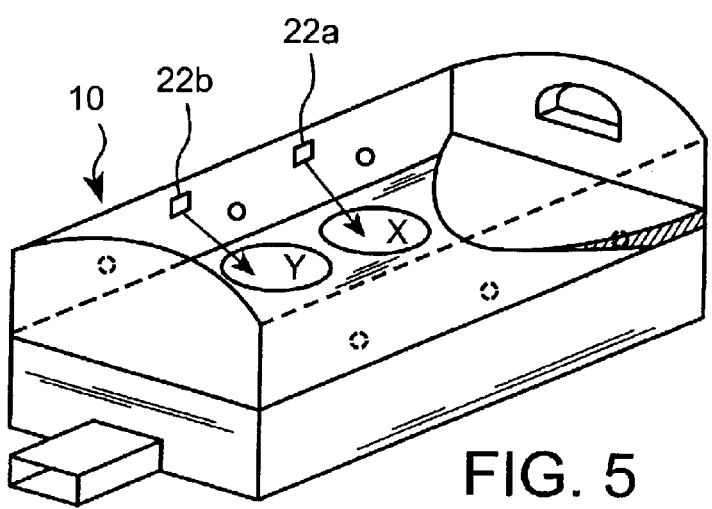
FIG. 5 is a perspective view of a system which includes a glass melting furnace wherein two ultrasonic energy sources provide different ultrasonic energies to two zones of the foam layer, in accordance with another aspect of the present invention.

For example, referring to FIG. 5, a first type of foam can be present at a first zone X of the foam layer 24, and a second type of foam (which is different from the first) can be present at a second zone Y of the foam layer 24. A first ultrasonic energy source 22a can be provided which is directed to the first zone X and is effective for reducing the amount of the first foam. A second ultrasonic energy source 22b can be provided which is directed to the second zone Y and is effective for reducing the amount of the second foam. Similarly, an $n^{th}$ ultrasonic energy source 22 can be used which is effective for reducing an $n^{th}$ foam present in an $n^{th}$ additional zone. The zones of foam can occupy separate areas or overlap.

As shown in FIG. 4A, the heat from the at least one heat source 16 and the ultrasonic energy from the at least one ultrasonic energy source 22 can be provided to the same area of the foam layer 24. This embodiment can provide the efficient transfer of heat to the molten material 18 because the heat is directed to a portion of the foam layer 24 which has been reduced or removed.

While the invention has been described with preferred embodiments, it is to be understood that variations and modifications can be resorted to as will be apparent to those skilled in the art such variations and modifications are to be considered within the purview and the scope of the claims appended hereto.

What is claimed is:

1. A method for reducing or removing a foam present in a glass melting furnace, comprising:

providing an ultrasonic energy emitted from at least one ultrasonic energy source to a foam present above the surface of a molten material in a glass melting furnace, wherein the ultrasonic energy is effective to reduce or remove at least a part of the foam, and wherein the at least one ultrasonic energy source is arranged entirely above the surface of the molten material.

2. The method according to claim 1, wherein the foam is present above the molten material in the form of a foam layer.

3. The method according to claim 2, wherein the ultrasonic energy is effective to reduce at least a part of the foam layer in the glass melting furnace by from about 25% to about 100% of the thickness of the foam layer.

4. The method according to claim 3, wherein the ultrasonic energy is effective to reduce at least a part of the foam layer in the glass melting furnace by from about 50% to about 100% of the thickness of the foam layer.

5. The method according to claim 1, wherein the maximum temperature in the glass melting furnace is at least about 1,400 EC.

6. The method according to claim 2, wherein the ultrasonic energy is provided to from about 10% to about 50% of the surface area of the foam layer.

7. A method for reducing or removing a foam present in a glass melting furnace, comprising:
providing an ultrasonic energy emitted from at least one ultrasonic energy source to a foam present above the surface of a molten material in a glass melting furnace, wherein the ultrasonic energy is effective to reduce or remove at least a part of the foam, wherein the foam is present above the molten material in the form of a foam layer, and wherein the at least one ultrasonic energy source is arranged above the surface of the foam layer.

8. The method according to claim 1, wherein the at least one ultrasonic energy source is arranged at a sidewall or a crown of the glass melting furnace.

9. The method according to claim 1, wherein the ultrasonic energy is provided by a plurality of ultrasonic energy sources.

10. A method for reducing or removing a foam present in a glass melting furnace, comprising:
providing an ultrasonic energy emitted from at least one ultrasonic energy source to a foam present above the surface of a molten material in a glass melting furnace, wherein the ultrasonic energy is effective to reduce or remove at least a part of the foam, wherein the ultrasonic energy is provided by a plurality of ultrasonic energy sources, and wherein a first ultrasonic energy source is arranged at a sidewall of the glass melting furnace, and a second ultrasonic energy source is arranged at a crown of the glass melting furnace.

11. The method according to claim 2, wherein the foam layer includes at least two zones, and wherein the at least one ultrasonic energy source alternately provides the ultrasonic energy to each of the at least two zones.

12. The method according to claim 2, wherein the foam layer includes a first zone and a second zone, wherein a first ultrasonic energy source provides a first ultrasonic energy to the first zone, and a second ultrasonic energy source provides a second ultrasonic energy to the second zone.

13. The method according to claim 1, wherein the ultrasonic energy is at a frequency of from about 25 kHz to about 125 kHz.

14. The method according to claim 2, wherein the ultrasonic energy and the heat emitted from a heat source are directed to the same area of the foam layer.

15. A system for reducing or removing a foam present in a glass melting furnace, comprising:
at least one ultrasonic energy source for providing an ultrasonic energy to a foam present above the surface of a molten material in the glass melting furnace, wherein the ultrasonic energy is effective to reduce or remove the foam, and wherein the at least one ultrasonic energy source is arranged entirely above the surface of the molten material.

16. The system according to claim 15, wherein the glass melting furnace comprises at least one heat source effective for melting a raw material to form the molten material.

17. The system according to claim 15, wherein the foam is present above the molten material in the form of a foam layer.

18. The system according to claim 17, wherein the ultrasonic energy is effective to reduce at least a part of the foam layer in the glass meting furnace by from about 25% to about 100% of the thickness of the foam layer.

19. The system according to claim 18, wherein the ultrasonic energy is effective to reduce at least a part of the foam layer in the glass melting furnace by from about 50% to about 100% of the thickness of the foam layer.

20. The system according to claim 17, wherein the at least one ultrasonic energy source is capable of providing ultrasonic energy to from about 10% to about 50% of the surface area of the foam layer.

21. A system for reducing or removing a foam present in a glass melting furnace, comprising:
at least one ultrasonic energy source for providing an ultrasonic energy to a foam present above the surface of a molten material in the lass melting furnace, wherein the ultrasonic energy is effective to reduce or remove the foam, wherein the foam is present above the molten material in the form of a foam layer, and wherein the at least one ultrasonic energy source is arranged above the surface of the foam layer.

22. The system according to claim 15, wherein the at least one ultrasonic energy source is arranged at a sidewall or a crown of the glass melting furnace.

23. The system according to claim 15, wherein the system comprises a plurality of ultrasonic energy sources.

24. A system for reducing or removing a foam present in a glass melting furnace, comprising:
at least one ultrasonic energy source for providing an ultrasonic energy to a foam present above the surface of a molten material in the glass melting furnace, wherein the ultrasonic energy is effective to reduce or remove the foam, wherein the system comprises a plurality of ultrasonic energy sources, and wherein a first ultrasonic energy source is arranged at a sidewall of the glass melting furnace, and a second ultrasonic energy source is arranged at a crown of the glass melting furnace.

25. The system according to claim 17, wherein the foam layer includes at least two zones, and wherein the at least one ultrasonic energy source alternately provides the ultrasonic energy to each of the at least two zones.

26. The system according to claim 17, wherein the foam layer includes a first zone and a second zone, wherein a first ultrasonic energy source provides a first ultrasonic energy to the first zone and a second ultrasonic energy source provides a second ultrasonic energy to the second zone.

27. The system according to claim 15, wherein the at least one ultrasonic energy source provides the ultrasonic energy at a frequency of from about 25 kHz to about 125 kHz.

28. The system according to claim 17, wherein the ultrasonic energy and the heat emitted from a heat source are directed to the same area of the foam layer.

29. The method according to claim 1, wherein the at least one ultrasonic energy source is arranged such that the ultrasonic energy is not directly introduced into the molten material.

30. The method according to claim 7, wherein the at least one ultrasonic energy source is arranged such that the ultrasonic energy is not directly introduced into the molten material.

31. The method according to claim 10, wherein the at least one ultrasonic energy source is arranged such that the ultrasonic energy is not directly introduced into the molten material.

32. The system according to claim 15, wherein the at least one ultrasonic energy source is arranged such that the ultrasonic energy is not directly introduced into the molten material.

33. The system according to claim 21, wherein the at least one ultrasonic energy source is arranged such that the ultrasonic energy is not directly introduced into the molten material.

34. The system according to claim 24, wherein the at least one ultrasonic energy source is arranged such that the ultrasonic energy is not directly introduced into the molten material.

35. The method according to claim 7, wherein the ultrasonic energy is at a frequency of from about 25 kHz to about 125 kHz.

36. The method according to claim 10, wherein the ultrasonic energy is at a frequency of from about 25 kHz to about 125 kHz.

37. The method according to claim 21, wherein the at least one ultrasonic energy source provides the ultrasonic energy at a frequency of from about 25 kHz to about 125 kHz.

38. The method according to claim 24, wherein the plurality of ultrasonic energy sources provides the ultrasonic energy at a frequency of from about 25 kHz to about 125 kHz.

* * * * *